Dec. 4, 1962     J. A. GRÉGOIRE     3,066,929
SUSPENSION OF VEHICLES Filed March 22, 1960     5 Sheets-Sheet 1

INVENTOR
JEAN ALBERT GRÉGOIRE
BY
Mead, Browne, Schuyler & Beveridge ATTORNEYS

Dec. 4, 1962   J. A. GRÉGOIRE   3,066,929
SUSPENSION OF VEHICLES
Filed March 22, 1960   5 Sheets-Sheet 2

INVENTOR
JEAN ALBERT GRÉGOIRE
BY
ATTORNEYS

Dec. 4, 1962     J. A. GRÉGOIRE     3,066,929
SUSPENSION OF VEHICLES Filed March 22, 1960     5 Sheets-Sheet 3

INVENTOR
JEAN ALBERT GRÉGOIRE
BY
ATTORNEYS

Dec. 4, 1962 J. A. GRÉGOIRE 3,066,929
SUSPENSION OF VEHICLES
Filed March 22, 1960 5 Sheets-Sheet 5

INVENTOR
JEAN ALBERT GRÉGOIRE
BY
ATTORNEYS

३,०६६,९२९
SUSPENSION OF VEHICLES
Jean Albert Grégoire, 92 Avenue Niel, Paris, France
Filed Mar. 22, 1960, Ser. No. 16,671
Claims priority, application France June 9, 1959
10 Claims. (Cl. 267—31)

My invention is a continuation-in-part of my copending application Ser. No. 591,434, now U.S. Patent No. 2,984,475 which issued on May 16, 1961, and relates to improvements to the suspension of vehicles of all types and, more particularly, of automobiles.

It is known that, in order to obtain satisfactory comfort in a vehicle, such as an automobile, it is necessary for the frequency of vibration of the suspension system to lie within certain limits of the order of 60 to 80 vibrations per minute. The frequency of vibration of a suspension is shown approximately by the following formula:

$$F = 30\sqrt{\frac{R}{P}} \quad (1)$$

wherein P represents the suspended weight and R represents the rigidity of the suspension, i.e. the value determined as follows: when the difference in level between the suspended and the non-suspended parts varies, as a function of the load of the vehicle, the rigidity is the ratio of the rate of increase of the load to the rate of decrease of this difference in level, i.e. the derivative of the load with respect to the difference in level for the position in question.

The above formula shows that, when it is desired to maintain comfort for all the static loads of the same vehicles, it is advantageous for the rigidity of the suspension to vary as a function of the load, so that the frequency F remains substantially constant within the limits indicated, i.e. said rigidity must vary in a manner substantially proportional to the load.

The spring suspension devices of the usual type have generally constant rigidities.

Consequently, the frequency of vibration of these suspensions decreases constantly and substantially as a function of the load and, as a result, if these frequencies are selected, for example for the purpose of providing satisfactory comfort for the loaded vehicle, the frequency when empty is too high, with the result that the suspension is too hard when empty. If, on the other hand, there is a permissible frequency when empty, when loaded the frequency will be too low and the suspension too soft.

In addition, it should be considered that the suspension of a vehicle must be such as to take into account fundamental practical requirements for each vehicle, as follows:

(1) The value of the minimum static load (weight when empty);

(2) The value of the maximum static load (weight when loaded);

(3) The value of the dynamic load on abutting or, what amounts to the same thing, what is termed the dynamic coefficient, i.e. the ratio of the load on abutting to the maximum load;

(4) The deflection of the suspension between the position when empty and said position obtained on abutting against its support for maximum thrust conditions.

In the case of the usual type of constant rigidity spring suspension, these conditions determine the characteristics of the suspension and, more particularly, the value of the deflection corresponding to the maximum static load, this deflection being obviously lower than that corresponding to the position obtained by the suspension when abutting against its support.

In the normal suspensions under consideration, this deflection between the position when empty and that when loaded is relatively slight with respect to the total deflection (between the position when empty and that on abutting against the support) which leads, for a required total deflection, to have a relative high rigidity of the spring, which further increases the above drawbacks.

Moreover, efforts have been made to produce pneumatic suspensions, i.e. suspensions in which the spring is replaced by a capacity containing air under pressure, the volume of which varies with the static or dynamic load of the vehicle, it being possible to obtain this capacity by means of bags or bellows, or the like, or by piston and cylinder systems. Such suspensions have variable rigidities, but the rigidity in this case varies to too large an extent as a function of the load, at least when the aim is to produce said suspensions with acceptable dimensions, so that the disadvantage is the reverse of that shown by spring suspensions. The frequency F is actually far higher for a loaded vehicle than for an empty vehicle, so that it is not possible to have the desired degree of comfort for all the loads the vehicle must support; such suspensions are generally either too soft when empty or too hard when fully loaded.

The object of the invention is to overcome these disadvantages and to enable suspensions to be obtained, the frequency of vibration of which remains as constant as possible within the limits mentioned, whatever the static load may be.

A further object is to produce suspensions in which the deflection between the position when empty and the loaded position is greater than that obtained with the normal type of spring suspensions, and better adapted, as a result, to give a satisfactory operation of the suspension, at the same time permitting an adequate deflection between the position of maximum static load and that when abutting against the support, while ensuring a suitable dynamic coefficient.

Another aim of the invention is to design and manufacture suspensions of this type at a reduced cost, without necessitating any special maintenance or control. It likewise aims at producing particularly noiseless suspensions, these forming in themselves an elastic stop preventing the abrupt shock of the vehicle body against the fixed support, which limits the movement of said body when the fully loaded vehicle travels over very uneven stretches of terrain, for example.

In accordance with the invention, these results are obtained, due to the fact that the suspension for each wheel or wheel assembly is in the form of a mechanical spring device (spiral spring, semi-elliptical spring, torsion bar, rubber, for example), the rigidity of which will be practically constant or slightly variable and which is combined with a pneumatic device of very variable rigidity, these two members being made in such a way that the rigidity of the unit, which is equal to the sum of the rigidities of the two members, varies appreciably in proportion to the load between the position when empty and the position of maximum static load of the vehicle. The pneumatic device can be made in any suitable manner whatsoever, for example, it may be in the form of a piston and cylinder unit, but, preferably, in the form of a pneumatic cushion carried by either the suspended or non-suspended part of the vehicle and compressed by means of a plunger which is attached to the other non-suspended or suspended part of the vehicle, said units, comprising the cushion and the plunger, being mounted, for preference, directly between the suspended and the non-suspended part of the vehicle.

In the preferred embodiment of the invention, the pneumatic device, which must be absolutely airtight, is under a pressure equal or substantially equal to atmospheric pressure for the position of the vehicle when absolutely free of load, i.e. the position for which the vehicle rests on its wheels by means of the suspension, without carrying any luggage, driver or passenger.

The constant rigidity suspension device is then calculated so as to support substantially the whole weight of the vehicle in its said position free of load, the pneumatic device carrying then substantially no load in said position and taking on a progressively increasing part of the load in proportion to any subsequent increase in said load.

In accordance with my invention, when the pneumatic device is formed by a cushion which is compressed by means of a plunger and when the cushion is formed by a type of rigid bell closed by a flexible diaphragm, said diaphragm can be manufactured from some elastic material (natural or synthetic rubber without any canvas covering, for example).

In this case, during the compression by the plunger, the diaphragm experiences a slight expansion which, nevertheless, is no actual disadvantage from the standpoint of operation of the suspension.

It has been found that such diaphragms, which are actually subject to only comparatively low pressures when the pneumatic members are at atmospheric pressure or at a pressure near atmospheric pressure for the empty position of the vehicle, retain their properties for a practically indefinite period.

Moreover, in accordance with my invention, by selecting a plunger, the outside diameter of which is such that beyond the position of maximum static load, only a slight fraction of the initial surface of the diaphragm may expand, there is obtained at the end of the travel a pneumatic stop which is both progressive and efficient.

Moreover, in every case and, more particularly, when pneumatic devices of the type mentioned are used, where the pressure is substantially equal to atmospheric pressure when the vehicle is in its empty position, it is possible, in accordance with my invention, to achieve a very simple system for regulating the useful volume of the capacity of the compression chamber limited by the diaphragm. For this purpose, it is only necessary to allow, either during or after manufacture, the introduction into said chamber limited by the diaphragm of a predetermined and adjustable amount of liquid (oil, for example), which obviously presents no difficulty when the chamber is at atmospheric pressure for the empty position of the vehicle. Actually, it is only necessary to carry out this introduction when the chamber is at exactly atmospheric pressure. In this way, it is possible to control the exact desired value of the volume of said chamber when at atmospheric pressure, thereby eliminating any difficulty in the way of manufacturing said chamber.

On the other hand, it should be pointed out that when the compression compartment is set at atmospheric pressure for the empty position of the vehicle, the diaphragm of said compartment can and should be relatively thin since when the plunger enters the compartment, the major part of the diaphragm bears on said plunger and the greater part of the load is then transmitted by the pressure of the air acting on the part of the plunger engaging said part of the diaphragm. Then, not more than only a peripheral fraction of said diaphragm is subjected to the pressure difference between the chamber and the atmosphere, and this peripheral part of the diaphragm thus only supports a relatively small fraction of the load. Actually, it is this peripheral part of the diaphragm which can expand, and as it decreases more and more, it will be understood that the expansion becomes more and more difficult.

In accordance with my invention, the pneumatic cushion will, preferably, be made simply by crimping a rubber diaphragm onto a rigid member or bell, which allows a perfect and practically unlimited sealing therebetween.

In accordance with my invention, this crimping will be effected, for preference, at a well-defined temperature in order that all the cushions of the same series will have strictly the same characteristics as regards internal pressure.

Now, it may occur that the arrangement of such an atmospheric cushion including a bell and a diaphragm is too bulky for it to be possible to insert it in the desired location. This bulk may be reduced according to a further feature of my invention, while ensuring a satisfactory fluidtightness. It allows, in particular, preventing any member from projecting practically beyond the operative periphery of the diaphragm. To this end, I may resort to an auxiliary bell, so that the diaphragm is held fast between the main bell and the auxiliary bell. Said bell may, in fact, be replaced by a mere strip, or again, the crimping may be obtained by means of suitable collars.

Other objects and features of my invention will become apparent in the reading of the following description, taking into account the appended drawings, which show diagrammatically, by way of a non-limiting example, various embodiments of said invention. In said drawings:

FIGS. 7, 8a and 8b show computed examples of a suspension in accordance with the invention.

Figure 1:
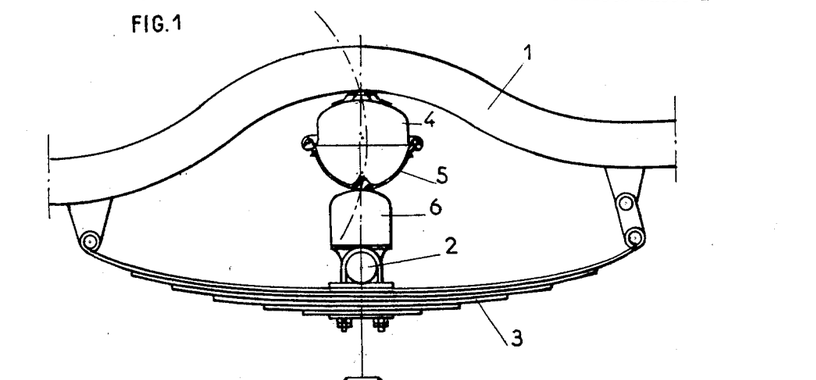
FIG. 1 shows the whole of a suspension device comprising, on the one hand, a spring suspension member and, on the other hand, a pneumatic suspension member.

In FIG. 1, 1 represents the suspended part of the vehicle or bodywork, 2 the non-suspended part or axle, 3 a semi-elliptical spring, for example, which forms the spring suspension member connecting the suspended part to the non-suspended part; the pneumatic suspension member is formed, on the one hand, by a capacity 4 in the form of a bell closed by a deformable diaphragm 5, the unit constituting the pneumatic cushion 4—5 forming part of the suspended part of the vehicle, for example, and, on the other hand, by a plunger 6 carried by the axle 2 and bearing against the diaphragm 5 in such a way as to press it into the capacity closed by the diaphragm, reducing to the same extent the volume of air contained therein, the air pressure reacting on the plunger in such a way as to form the elastic suspension member. The whole is arranged so that the reaction force exerted by the air in the capacity on the plunger is substantially zero in the position of no load of the vehicle (FIGS. 1 and 2), this reaction increasing gradually in proportion to the increase in the load of the vehicle.

In accordance with the present invention, the diaphragm 5 is made of an elastic material, such as natural or synthetic rubber, without any canvas insert.

It should be noted that the total load taken up by the suspension member is equal to the sum of the actual mechanical reaction of the diaphragm and the purely pneumatic reaction due to the compressed gas acting on the plunger.

It is advantageous for the actual load on the diaphragm to be very light compared with the purely pneumatic load obtained by compressing the gas and it is for this reason that, in accordance with my invention, the diaphragm 5 has a thickness just sufficient to withstand without risk of permanent deformation the action of the gas pressure. As the plunger penetrates into the capacity or chamber 4 containing the air which it thus compresses, the diaphragm 5 will gradually engage the plunger until it enters possibly the position shown in broken lines in FIG. 2, corresponding to the position of abutting against the support.

I will now disclose some other conditions which the diaphragm must satisfy to ensure satisfactory operation.

In the first place, it being understood that the plunger may be offset and even slightly tilted with respect to the cushion formed by the capacity 4, the diaphragm will have, preferably, the form of a spherical cap or some similar form.

On the other hand, in order to prevent excessive straining of the rubber, the total deflection H of the diaphragm (FIG. 2) should not exceed the value of the maximum diameter D of the operating part.

Figure 2:
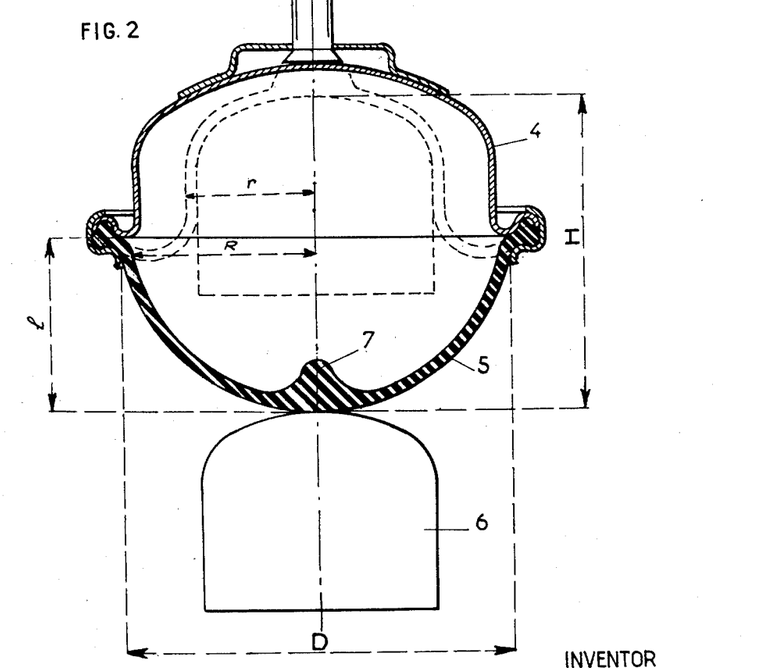
FIG. 2 shows, on a larger scale, and in greater detail, the pneumatic suspension member executed in accordance with the present invention.

Moreover, the diaphragm should be able to expand as far as maximum penetration of the plunger allows, which corresponds to the position when abutting against the support, shown in broken lines in FIG. 2, without experiencing any elongation, other than that due to the expansion caused by the pressure. For this purpose, the height $l$ of the diaphragm when free (FIG. 2) should be of a sufficient size with respect to H (approximately one half thereof).

If the device has likewise to act as a positive stop, there will be provided in the central portion of the diaphragm a projection shown at 7 (FIG. 2).

The thickness of the diaphragm is, as pointed out hereinbefore, substantially very small and approximately proportional to the diameter D, being between 2 and 5% of this diameter, for example.

The plunger 6 will have, advantageously, a top of a spherical shape with a radius of the order of that of the diaphragm radius merging into the cylindrical part along a surface of a variable radius, depending on whether a rapid increase in the load as a function of the deflection is or is not required. However, it should not be so small as would allow the formation of folds in the diaphragm.

The diametrical clearance between the plunger and the bell 4 should be sufficient to absorb possible variations in position of the plunger with respect to the diaphragm.

In order to obtain the maximum efficiency of the device, the base of the bell 4 should be such that the volume of residual air between said bell and the diaphragm in its position of maximum deflection may be as small as possible, taking into account any possible lateral displacement of the plunger. The bottom of the bell 4 will thus have a substantially spherical shape concentric with that of the top of the plunger.

As has been mentioned in the foregoing, it may happen that, for reasons of construction, it may not be possible for the bell 4 and the diaphragm 5 to be of such shape and size that when the plunger is completely driven into the bell 4, the volume of the residual air will be reduced to a sufficient extent. To overcome this disadvantage, in accordance with my invention, it is possible to inject a suitable quantity of liquid into the capacity 4 so as to reduce said residual volume.

Figure 3:
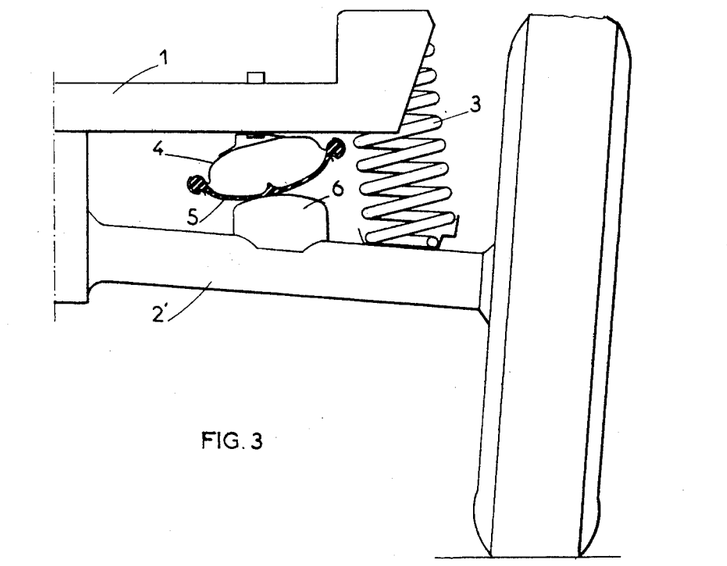
FIGS. 3 and 4 show, in two different positions, a modification of the suspension device in its application to a vehicle with independent half axles, the constant rigidity suspension member of which is formed by a coil spring, while its pneumatic cushion, instead of operating in registry with the wheel, operates approximately at the center of the half axle.
Figure 4:
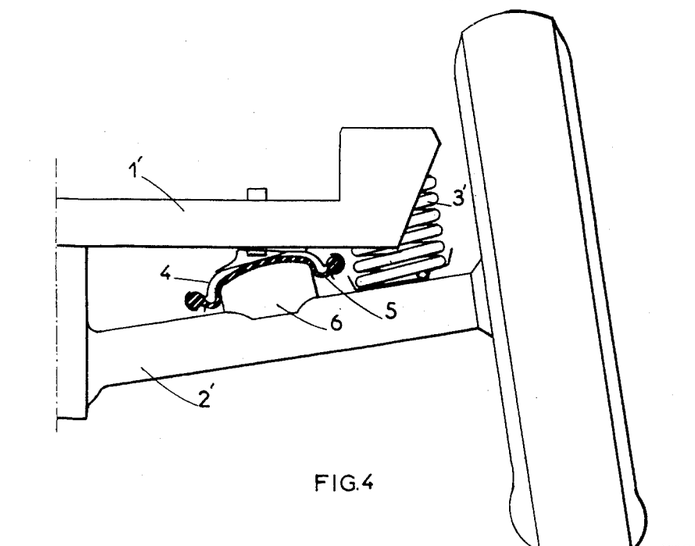

The embodiment shown in FIGS. 3 and 4 relates, as already indicated, to a suspension of a half axle suspended by means of a coil spring and a pneumatic cushion. In these figures, the axle 2' is capable of swinging between two extreme positions, i.e. the position of no load (FIG. 3) and the position of maximum load and of abutment against the support (FIG. 4). In these figures, it can be seen that the spring 3' is positioned directly between the half axle 2' and the chassis 1' and that the pneumatic suspension member is likewise placed between the half axle 2' and the chassis 1', but in the vicinity of the center part of said half axle. As in the foregoing, 6 indicates the plunger, 4 represents the bell and 5 the diaphragm, the combination of which forms the pneumatic capacity or cushion, and it can be seen in these figures that, in order to have a satisfactory operation, the cushion 4—5 is tilted in such a way that when in the position of maximum load (FIG. 4), the plunger is substantially coaxial with the bell 4 after having pushed back the diaphragm 5.

Figure 5:
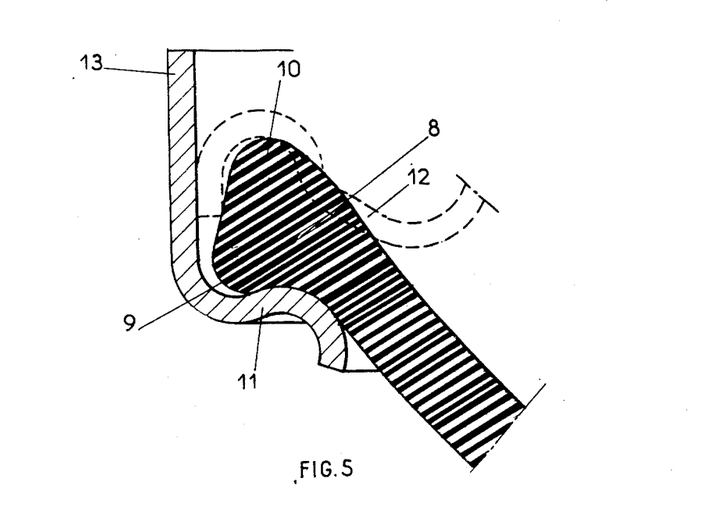
FIGS. 5 and 6 show, on a still larger scale, the details of the cushion in the course of its manufacture.
Figure 6:
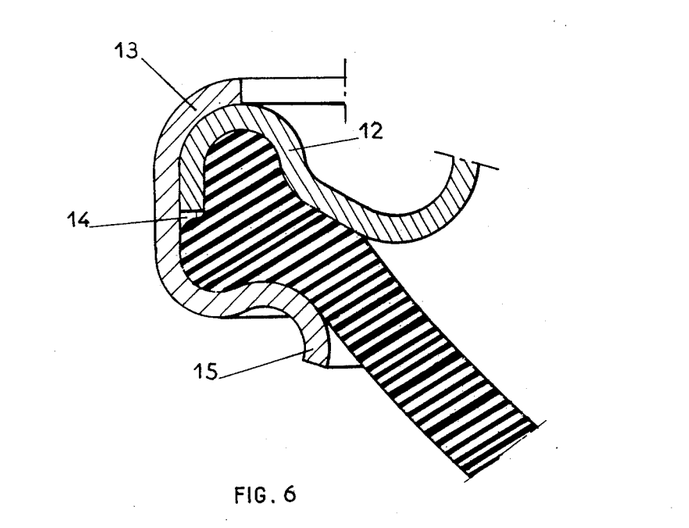

In accordance with the foregoing, naturally, it must be assumed that the seal between diaphragm and bell 4 is absolutely airtight. This problem can be overcome in accordance with the invention as follows: in this respect, FIGS. 5 and 6 show, on an enlarged scale, how the diaphragm is crimped into the rim of the bell 4, in order to obtain the desired result; in accordance with my invention, the diaphragm 5 has on its periphery a collar of increased thickness 8 comprising two beads 9 and 10, as shown more particularly in FIG. 5. The lower part of a backing-up crimping flange is indicated at 11, and inside said flange the bead 9 comes to rest in its undeformed shape; said bead is crimped between the flange and the rim 12 of the ball 4 which is shown in broken lines in FIG. 5 and in full lines in FIG. 6. The upper part 13 of the backing-up crimping flange is shown in its position prior to crimping in FIG. 5 and its position after crimping in FIG. 6, the result of the crimping being to fold back this part 13 over the rim 12 in the way shown in FIG. 6 with a squeezing of the bead 8.

It can thus be seen how the bead 8 of the diaphragm is distorted by crimping. As it moves downwards, the rim 12 of the ball 4 forces a certain volume of rubber towards the outside of the device by occupying almost but not entirely all the free space between the diaphragm and the flange. The rubber is thus placed under tension and this ensures an absolutely tight sealing of the pneumatic member.

The volume of rubber displaced and that of the space between diaphragm and flange are calculated so that there remains, as indicated in the foregoing, a small free space 14 between them. This prevents the formation on the inside of the diaphragm of an increased thickness which might interfere with the operation of the diaphragm and cause very high local fatigue.

FIG. 6 shows the unit after crimping, the flange being turned back over the rim 12 of the bell 4. It will be noted that the diaphragm then includes two projections beyond its normal thickness forming a double anchoring on both sides. This arrangement, associated with the crimping by deformation, ensures an excellent resistance to the pull exerted on the diaphragm by the pressure of the gas.

Furthermore, it will be noted that the edge 15 of the backing-up crimping flange is shifted away from the diaphragm, so that, as a result of its expansion, the diaphragm does not engage the more or less sharp edge of said flange and cannot be cut thereby.

To ensure where necessary a still more secure backing of the bead 9 in its crimping members, there can be provided in said bead a wire similar to those provided in the beads of tyres.

The fact that the air which fills the cushion must normally be at a pressure approximating atmospheric pressure for the position of no load, i.e. when the cushion is free, naturally facilitates the operation of crimping which can be carried out directly in a factory without any special precautions. However, as in a factory the pressure and the temperature may be variable, depending on meteorological conditions, the result could be that the cushions manufactured in mass production will not always contain the same amount of air, the crimping should preferably be undertaken in an atmosphere, the pressure and temperature of which are well-defined and constant for each batch of cushions.

In practice, to obtain satisfactory results, it is arranged for the component parts of the cushion to travel in the desired relative position through an air-conditioned tunnel for the time required, i.e. for the diaphragm and the ring to be placed on the bell, while providing at the same time for equalization of pressure by air. At the outlet of the tunnel, the cushion is crimped. As the operation is an extremely quick one, the temperature of the air will not have time to vary.

As has been described elsewhere, the crimping causes a squeezing of the outside collar of the diaphragm. The extent of squeezing is of the order of 1 to 2 mm. in height.

As the crimping operation is very quickly performed and as the bell is in contact with the diaphragm as soon as the operation begins, the squeezing action takes place under practically perfect conditions as regards air-tightness. A slight internal pressure results, which compensates to a certain extent the variations in outside temperature or pressure. It is possible, for example, to compensate for a drop in temperature of the order of 5 to 10° C. (with constant pressure) or an increase in outside pressure (with constant temperature) of the order of 25 to 30 grs. per sq. cm., i.e. a variation of approximately 20 mm. of mercury.

If the temperature should rise or if the outside pressure should drop, the efficiency of the cushion would increase. These disturbances could only lead to an insignificant reduction in comfort, since their effect can only be felt on the pneumatic part of the suspension, while the mechanical part will remain constant.

Now, with reference to FIGS. 7 and 8, a method will be described by means of which the shapes and dimensions of a cushion functioning at atmospheric pressure under no load condition can be determined for the purpose of obtaining a suspension having the desired characteristics of operation.

Figure 7:
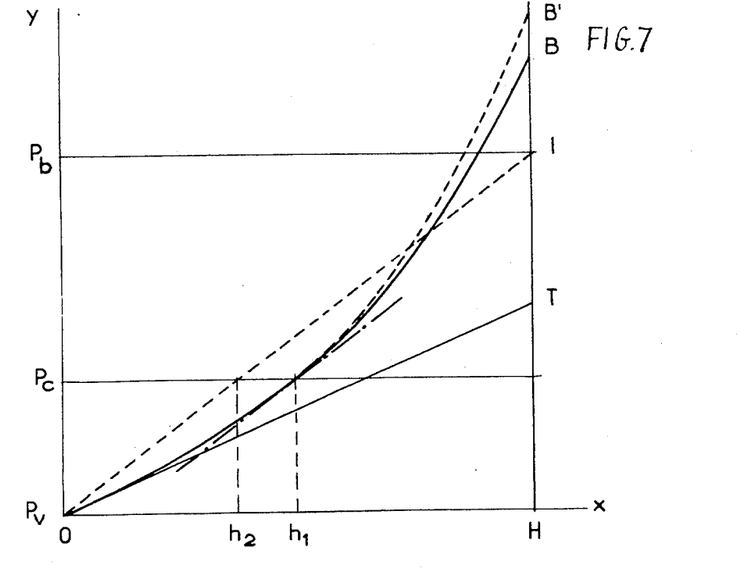
FIG. 7 is a diagram showing the deflection of the suspension as a function of the load and FIGS. 8a and 8b show alternative forms to be given to the cushion, in order to achieve, in accordance with calculation, a satisfactory suspension.

FIG. 7 is a diagram giving, for different suspensions, the variation of the load as a function of the deflection (on the abscissae $Ox$ there are shown the deflections, and on the ordinates $Oy$, the loads). The derivative of these curves, i.e. the angular coefficient of the tangents to these curves corresponds substantially to the "rigidity" of these suspensions as has been defined in the introduction.

Assuming that, for each wheel:
(1) The suspended weight with absolutely no load $P_v$;
(2) The suspended weight when fully loaded $P_c$;
(3) The total deflection H available between the position with no load and the extreme position when striking the support, which total deflection can, moreover, be selected or predetermined, but which is generally predetermined, are known.

First, the value of the frequency $n$ will be calculated and this must be maintained approximately constant for all static loads between $P_v$ and $P_c$.

Generally, satisfactory results will be obtained by taking a frequency equal to or slightly below that obtained in the position of maximum static load with a normal suspension of constant rigidity established with the above data, i.e. $P_v$, $P_c$ and H.

In order to completely define this suspension with constant rigidity, it is necessary to estimate the dynamic load $P_B$ attained in the extreme position of abutment. Experience has shown that satisfactory results are obtained by taking into account a dynamic load equal to approximately 1.7 times the maximum static load. The rigidity is then:

$$\rho = \frac{P_B - P_x}{H}$$

for this normal suspension and, accordingly, the frequency, when fully loaded, will be:

$$n = 30\sqrt{\frac{\rho}{P_c}} \text{ (approximate formula)}$$

In FIG. 7, the characteristic curve of such a normal suspension is supplied by the straight dotted line OI.

In the combination—pneumatic cushion and mechanical spring—the rigidity of the cushion can be kept at zero in the position of no load, so that the rigidity which will ensure the frequency $n$ at this position must be that of the spring alone, i.e.:

$$K = \frac{(n)^2}{30} \times P_v$$

In FIG. 7, such a rigidity corresponds to the angular coefficient of the straight line OT. The spring which will cooperate with the cushion must have this rigidity. Its characteristic curve is thus the straight line OT.

As the frequency has to be maintained constant between th loads $P_v$ and $P_c$, a certain deflection is produced between these loads. This deflection is given by the formula:

$$h_v{}^c = \frac{(30)^2}{n} \times g \times L^{P_c}_{P_v}$$

wherein $g$ is gravity and $$L^{P_c}_{P_v}$$

is the Naperian logarithm of $$\frac{P_c}{P_v}$$

but, as in practice a slight drop in frequency between empty and loaded position is formed, a slightly higher deflection $OH_1$ (from 5 to 10%) will be taken.

It should be noted that $Oh_1$ is very much greater than $Oh_2$, which is the deflection between empty and loaded positions of the normal suspension with constant rigidity. This is one of the advantages of the invention referred to hereinabove.

The characteristic curve of the suspension shown in full lines in FIG. 7 will thus be tangent at O to OT and will pass through the point of abscissa $h_1$ and of ordinate $P_c$. It will then be noted that at this point the tangent to this curve is substantially parallel to OI, i.e. the rigidity of the suspension when loaded is the same as that of the constant rigidity spring suspension.

Consequently, the frequency of the suspension calculated in this way is the same when loaded and when empty, which is the result sought for.

It is then possible to calculate the loads that can be taken up by the spring in the positions of total load and of abutting, it being understood that it will only take up the load $P_v$.

When loaded, the spring will take $P_v + K \times h_v{}^c$ and when abutting $P_v + K \times H$.

The cushion should thus support the difference between $P_c$ and $P_v + K \times h_v{}^c$, i.e. C, in the position of maximum static load.

As regards the load to be supported by the cushion when abutting against the support, it is necessary to consider that the energy absorbed dynamically must be the same whatever the suspension. Actually, the travel between the loaded position and the position on abutting is greater for a normal suspension than for a suspension with constant frequency between empty and loaded conditions, as indicated in the foregoing. Consequently, the travel is less and the final load will have to be increased.

A coefficient of 1.8 to 2.2 applied to $P_c$ is generally satisfactory.

The load carried by the cushion on abutting is deduced therefrom, thus, for example: $B = 2P_c - (P_v + K \times H)$.

It will be noted that, actually, the load on abutting B is obtained adiabatically starting from the load C. For the purpose of calculation, it is easier to consider static loads and, in actual practice, it will be considered that the above coefficient 2 gives a load B obtained isothermally, so that the actual dynamic load B' will be higher and will correspond substantially to the coefficient 2.2.

For the purpose of limiting the work of the diaphragm and the likelihood of leakage, it is advisable to select as large a diameter of the cushion as the available space will permit without, at the same time, exceeding reasonable proportions.

As has been stated in the foregoing, the maximum diameter D of the operating part of the diaphgram must be at least equal to the total deflection H, and the thickness of the diaphragm should be between 2 and 5% of the diameter D (FIG. 2).

Considering the radii R (maximum inside radius of the diaphragm) and r (maximum outside radius of the diaphragm applied to the plunger), the operative cross-section of the cushion is defined by the diameter which is practically equal to $R+r$, i.e. the arithmetic mean between $2R$ and $2r$.

The diametrical clearance $\lambda$, i.e. the distance between the plunger covered by the diaphragm and the inside of the bell is, on the other hand, determined by the fact that it should be adequate to absorb the possible variations in the lateral position of the plunger, with respect to the diaphragm. It is necessary, of course, for $$R-r \geq \lambda$$

Knowing $R+r$ and $R-r$, accordingly, the diameter of the plunger can be deduced therefrom.

With the load B calculated earlier and the operative diameter $R+r$, the corresponding inside pressure is calculated as:

$$P_B = \frac{B}{\frac{\pi}{4}(R+r)2} + P_a$$

$P_a$ being the atmospheric pressure which will be taken as 1 for simplifying calculation.

With the help of the foregoing data, it is possible to design a cushion in a manner such that the ratio between the initial volume with the plunger not engaged and the final volume corresponding to the position on abutting, will be equal to $P_v$.

Figure 8A:
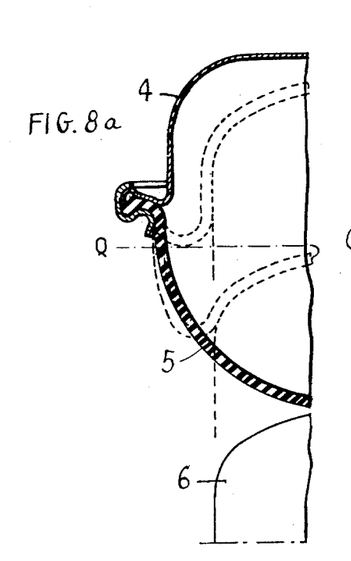
Figure 8B:
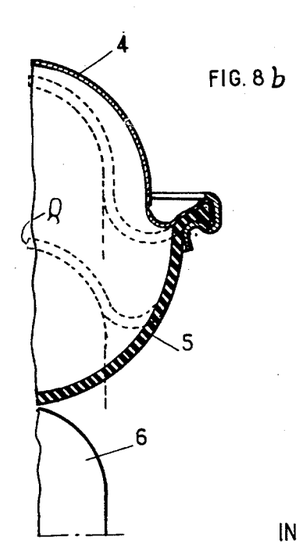

FIG. 8a shows the result of a first calculation based on the foregoing data, while FIG. 8b shows the result of the final calculation made after certain modifications.

As the material used for manufacturing the diaphragm is elastic, it is necessary to take this into consideration when calculating the volume.

Considering the measurements made with different designs, the increase in volume due to the elasticity of the diaphragm for the position on abutment can be taken to be approximately equal to 7 to 10% of the initial volume.

For the other positions between the abutting position and that of total load, this percentage diminishes in inverse proportion to the residual volume.

As a first approximation, the diaphragm is designed approximately in the shape of a hemisphere (left-hand half view in FIG. 8). Taking for the top of the plunger a radius approximating that of the plunger, there is obtained a plunger of a somewhat flattened shape. In general, this design gives results approximating those sought for.

In order to confirm this, different positions of the plunger will be drawn in the vicinity of the position when loaded, and the resulting residual volumes and accordingly the pressure will be calculated. The loads will be deduced from the diameters of the operative surfaces obtained for each position.

Thus, it will be found for which penetration of the plunger, i.e. for which deflection, the desired load C will be obtained and, at the same time, the section of the curve passing through the several calculated points will give the direction of the tangent and, accordingly, the actual rigidity of the cushion. Adding this to the rigidity of the spring, it will be possible to confirm whether the frequency is appreciably equal to that required. If there is found to be too big a difference for the position of total static load and, accordingly, a difference for the frequency, a correction could be made in either sense by modifying the shapes of the diaphragm and of the plunger respectively.

A more rounded shape of the plunger will move the position of total load away from the position when empty, whereas, inversely, a flatter shape will bring these positions close together.

On the other hand, the diameter of the cushion and of the plunger can likewise be acted upon, by observing the conditions listed above, viz:

$$\frac{D}{H} \geq 1$$

and $$R-r \geq \lambda$$

By increasing D, $h_c^e$ will be reduced and vice versa.

Such modifications will result, for example, in a cushion similar to that shown in the right-hand half-section in FIG. 8.

Finally, where it would be impossible to obtain a sufficiently small residual volume on abutting, due to the clearance required between the plunger and the bell, it would be of advantage to introduce a required amount of liquid inside the cushion.

If, after trial, the result obtained is not sufficiently close to that desired, there is still the possibility of acting on the thickness of the diaphragm to obtain such a result. The load—deflection curve—is straightened by increasing the thickness, whereas it is further curved by reducing said thickness.

Here is a numerical example of application of the process described in the foregoing:

A. DATA $P_v = 235$ kg.
$P_c = 400$ kg.

Deflection when empty—upon abutment H=16 cm.

This suspension is assumed as engaging the wheel (loads and deflections being measured on the wheel). If the suspension were arranged on an arm, it would be necessary to take into account the leverage, in order to determined the loads and deflections.

B. CALCULATIONS (1) *Determination of the Load Borne Upon abutment by a Suspension With Constant Rigidity*

Taking a dynamic coefficient equal to 1.7, then:

$$P_b = 1.7 \times P_c = 1.7 \times 400 = 680 \text{ kg.}$$

(2) *Rigidity of the Spring*

$$\rho = \frac{P_B - P_v}{H} = \frac{680 - 235}{16} = 27.8 \text{ kg./cm.}$$

(3) *Frequencies of Vibrations of the constant rigidity Suspension*

(a) When empty $$n_v = 30 \sqrt{\frac{2780}{235}} = 103 \text{ periods/min.}$$

(b) When loaded $$n_c = 30 \sqrt{\frac{2780}{400}} = 79 \text{ periods/min.}$$

(4) *Calculation of the Rigidity of the Main Spring of the Atmospheric Cushion Suspension*

If the rigidity of the cushion is disregarded, when empty, then:

$$K = \frac{(n)^2}{30} \times P_v = \frac{(79)^2}{30} \times 235$$

i.e.:
$$K = 16.29 \text{ kg. per cm.}$$

(5) *Determination of the Deflection Between Empty and Load*

A suspension with strictly constant frequency between empty and loaded conditions would have a deflection $h_v{}^c$ equal to:
$$\frac{(30)^2}{79\pi} \times 981 \times L\frac{400}{235} = 7.4 \text{ cm.}$$

In order to take into account the slight reduction in frequency between empty and loaded conditions, which results in increasing the deflection, $h_v{}^c$ will be taken as 8 cm.

(6) *Loads Taken by the Main Spring When Loaded and Upon Abutment*
$$C_{cr} = 235 + 16.29 \times 8 = 365.3 \text{ kg.}$$
$$C_{Br} = 235 + 16.29 \times 16 = 495 \text{ kg.}$$

(7) *Load on Abutment to be Absorbed Statically by the Suspension With Pneumatic Cushion*
$$P_B = 2P_c = 2 \times 400 = 800 \text{ kg.}$$

(8) *Loads Taken by the Cushion*

(a) When loaded:
$$C = P_c - C_{cr} = 400 - 365.3 = 34.7 \text{ kg.}$$

(b) Upon abutment:
$$B = P_B - C_{Br} = 800 - 495 = 305 \text{ kg.}$$

(9) *Calculation and Design of a Cushion*

It is necessary that
$$\frac{D}{H} \geqslant 1$$
and
$$R - r \geqslant \lambda$$
$\lambda$ = clearance between plunger and ball i.e.
$$= \frac{D}{16} \geqslant 1$$
and
$$R - r \geqslant 20 \text{ mm.}$$

Thickness of the diaphragm: $2\% \; D \leqslant e \leqslant 5\% \; D$

For a first design, let use take:
$$d = 180 \text{ mm.}$$
$$e = 5 \text{ mm.}$$
$$R - r = 20 \text{ mm.}$$

The diameter of the plunger is then: dia. $= 2r'$ so that:
$$r' = R - \lambda - e = 90 - 20 - 5 = 65 \text{ mm.}$$
and:
$$r = r' + e = 65 + 5 = 70 \text{ mm.}$$

Pressure upon abutment:
$$P_B = \frac{B}{\text{operative } S} + Pa \simeq \frac{B}{\frac{\pi}{4}(R+r)^2} 1$$

$$P_B = \frac{305}{\frac{\pi}{4}(9+7)^2} + 1 = 2.515 \text{ kg. per sq. cm.}$$

A first design shown in the left-hand half-section of FIG. 8 gives:

Volume displaced upon abutment $V_{dB} = 2.297$ c. cm.

Where $D_b$ represents the expansion upon abutment which is taken as equal to $m\%$ of the initial volume, $V_0$ with $m$ lying between 7 and 10%.

Let use take:
$$m = 10\%$$
$$V_B = V_c = V_{dB} + D_B = V_0 - V_{dB} + \frac{V_0}{10}$$

and:
$$V_B = \frac{V_0}{P_B} = \frac{V_0}{2.515}$$

whence:
$$V_0 = 3.270 \text{ c. cm.}$$

The finding of two other loads obtained from deflections of 50 and 100 mm. enables the load-deflection curve of the cushion to be drawn, and this, in conjunction with the curve of the main spring, gives the characteristics of the suspension.

For calculating the load given by the cushion for a deflection $y$, I start from:

(a) The volume displaced $V_{dy}$ (b) The residual volume for the deflection $y = V_{ry}$:
$$V_{ry} = V_0 = V_{dy} + D_y$$
with:
$$D_y = \frac{V_0 \times V_B \times m}{100(V_0 - V_b)} \times \frac{V_0 - V_{ry}}{V_{ry}}$$
whence:

$$V_{ry} \text{ and } P_y = \frac{V_0}{V_{ry}}$$

$P_y$ = operative $S(P_y - 1)$ with operative $S$ = the surface of the contact circle of the plane Q (FIG. 8) tangential to the diaphragm for the position of the plunger to be considered.

This cushion, connected to the main spring, gives a deflection $h_v{}^c$ equal to 75 mm. and a frequency when loaded of 82.5 cycles per minute, this frequency being much higher than the selected frequency 79.

The efficiency of the cushion when loaded will be reduced by modifying its shape and size:
$$D = 160 \text{ mm.}$$

Diameter of the plunger (hemispherical shaped plunger)
$$2r' = 90 \text{ mm.}$$

This shows:
$$V_0 = 1.802 \text{ c. cm.}$$
and:
$$h_v{}^c = 79 \text{ mm.}$$

$n_0 = 80.5$ periods per minute, a frequency close to that required.

In the method described and in the numerical calculation which follows, it is presumed that the pneumatic cushion was in the immediate vicinity of the wheel and that, consequently, the displacement of the plunger with respect to the cushion corresponds to the displacements of the wheel with respect to the suspended part of the vehicle and that the weight carried by the whole, comprising the pneumatic cushion and the spring, corresponds exactly to the load carried by the wheels.

Now, it may happen, and this is more particularly the case with the device illustrated in FIGS. 3 and 4, that the members of the pneumatic device are arranged in such a way that their relative displacements are only a fraction of the displacement of the bodywork with respect to the wheels and that the loads to be carried by this pneumatic device, by reason of the presence of the leverage, are, on the other hand, higher than the fraction of the load of the vehicle which they should support.

Thus, for example, in the case of FIGS. 3 and 4, the relative displacement of the plunger with respect to the cushion is substantially equal to half the deflection of the bodywork with respect to the wheels, while the load which is to be supported by this cushion will be double that which it would have to support if the displacement of the cushion with respect to the plunger were the same as the displacement of the bodywork with respect to the wheels. The foregoing calculations could, nevertheless, be applied in the same way, provided, of course, that in the calculations the data relating to the deflection and to the suspended loads are multiplied by corresponding coefficients.

Figure 9:
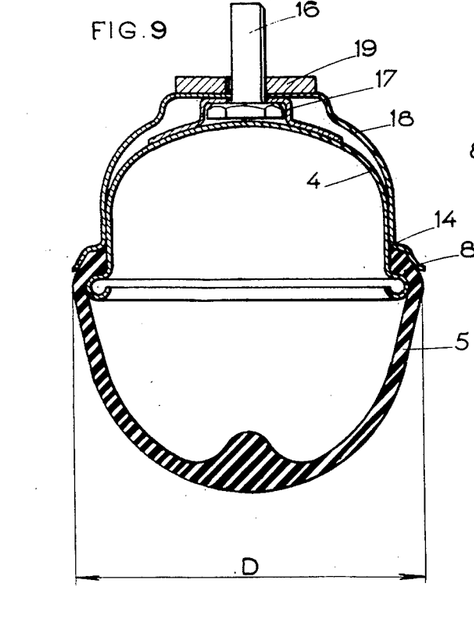
FIG. 9 is an axial cross-section of a cushion executed in conformity with a further embodiment.

Turning now to FIG. 9, the complete cushion includes a diaphragm 5 and the main bell 4 which is rigid with a screw 16, the square or hexagonal head of which screw is held inside a housing 17 welded to the upper surface of said bell. An auxiliary bell 18 is fitted over the main bell, so as to engage the diaphragm edge and to urge it into contacting relationship with the first-mentioned main bell. The clamping is ensured through a nut 19 which urges the auxiliary bell into intimate contact with the housing 17, so as to produce a limited and well-defined clamping of the diaphragm.

Figure 10:
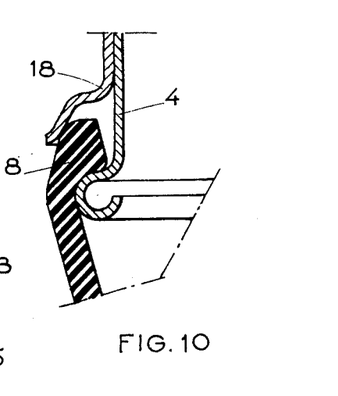
FIG. 10 is a partial cross-section on a larger scale of the cushion before its crimping.

FIG. 10 shows, on a larger scale, the original shape of the annular bead 8 provided along the edge of the diaphragm, before the nut is screwed home.

The cross-section of said bead is selected so that, after complete clamping, there remains a small empty annular recess at 14 along the outer periphery of the bead (FIG. 9). As a matter of fact, since rubber is not compressible, if the volume of the bead were larger than the space left free between the two bells, a projecting fold might form, which would be detrimental to the proper operation of the diaphragm.

Figure 11:
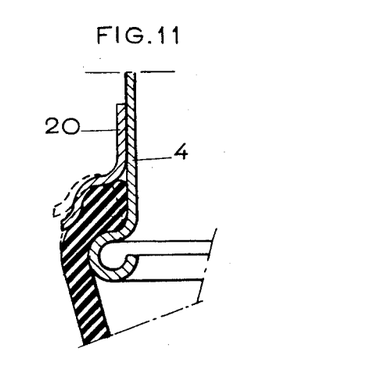
FIGS. 11, 12 and 13 are partial cross-sections corresponding to three further embodiments.

FIG. 11 shows that it is similarly possible to fit the diaphragm between the bell 4 and a ring 20 previously welded to the bell and the original shape of which, shown in dotted lines in FIG. 11, is such that it leaves a broad passage between it and the bell for the bead extending along the periphery of the diaphragm. When the diaphragm has been positioned, it is sufficient to deform the ring 20 through the agency of knurled wheels, for instance, so as to throttle the passage down to a breadth equal to the thickness of the diaphragm considered generally. The shape of the ring 20 after crimping is shown in solid lines.

As in the case of FIG. 10, the bead should not fill entirely the housing provided for it between the bell 4 and the ring 20.

In the embodiments illustrated in FIGS. 9 to 11, it is apparent that the diametrical bulk is limited to the diameter D of the diaphragm.

In the following examples resorting either to a collar or to a mere wire, the clamping is obtained through a pin, a screw or binding means, so that the bulk of the cushion is increased locally. In certain cases, it is however possible to find for a suitable angular setting of the cushion a recess for this projecting pin or the like.

Figure 12:
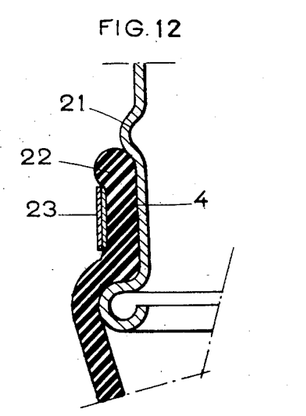

Numerous shapes of collars may be provided. In FIG. 12, only the detail of the assembly is shown. The bell 4 includes an annular rib 21 which properly defines the location of the bead 22 formed peripherally of the diaphragm, which is suitably shaped, so as to be engaged by the collar 23. The extent of clamping of the diaphragm may be obtained by an accurate definition of the length of collar required.

It should be remarked that a collar should always be wound twice round the member to be clamped or at least said member should be engaged by the collar over a sufficient length, so as to avoid any discontinuity in the clamping.

Figure 13:
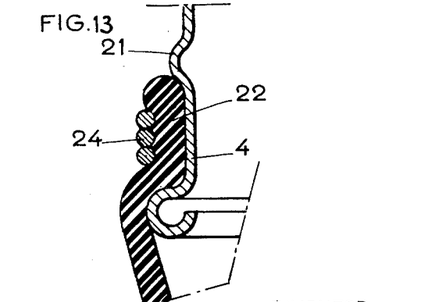

Similarly, if a mere wire 24 is used, as shown in FIG. 13, the latter should be wound twice round the diaphragm before its ends are bound together.

Obviously, many modifications may be brought to the embodiments disclosed hereinabove within the scope of the invention as defined in the accompanying claims.

What I claim is:

1. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, a punch associated therewith and adapted to engage the air chamber to a gradually increasing extent for increasing loads of the vehicle under the action of the relative shifting between the two parts of the vehicle, the contacting area between the air chamber and the punch for completely empty vehicle conditions being much smaller than the cross-sectional area of the punch, an unvarying mass of air filling said chamber and the pressure of which is substantially equal to atmospheric pressure when the vehicle is in its completely empty condition, said air spring having a variable rate, and an effective area of cross-section and normal volume of air so selected that the sum of the rates of the two springs varies in a manner to provide an approximately constant frequency of oscillations between no load and full load conditions.

2. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm fluidtightly closing the opening of the cup and adapted to expand freely in a horizontal direction, a plunger carried by the other part of the vehicle and engaging a substantial area of the yielding diaphragm to urge the latter gradually inwardly of the cup under the action of increasing loads and an unvarying mass of air filling said chamber and the pressure of which is substantially equal to atmospheric pressure under no load conditions of the vehicle, said air spring having a variable rate so selected that the sum of the rates of the two springs varies in a manner such as to provide an approximately constant frequency of oscillations between no load and full load conditions.

3. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm of uncanvassed rubber fluidtightly closing the opening of the cup and adapted to expand freely in a horizontal direction, the thickness of said diaphragm ranging between about 2 to 5% of the maximum transverse size of said diaphragm, a plunger carried by the other part of the vehicle and engaging a substantial area of the yielding diaphragm to urge the latter gradually inwardly of the cup under the action of increasing loads, and an unvarying mass of air filling said chamber and the pressure of which is substantially atmospheric pressure under no load conditions of the vehicle, said air spring having a variable rate so selected that the sum of the rates of the two springs varies in a manner such as to provide an approximately constant frequency of oscillations between no load and full load conditions.

4. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm of uncanvassed rubber fluidtightly closing the opening of the cup and adapted to expand freely in a horizontal direction, the thickness of said diaphragm ranging between 2 to 5% of the maximum transverse size of said diaghragm, a plunger carried by the other part of the vehicle and engaging a substantial area of the yielding diaphragm to urge the latter gradually inwardly of the cup under the action of increasing loads, the difference in diameter between the plunger and the diaphragm being such that for maximum static loading conditions of the vehicle, the end and periphery of the plunger have engaged the major part of the diaphragm and leave a narrow peripheral fraction of the latter free to expand to produce thereby a pneumatic abutment, and an unvarying mass of air filling said chamber and the pressure of which is substantially equal to atmospheric pressure, under no load conditions of the vehicle, said air spring having a variable rate so selected that the sum of the rates of the two springs varies in a manner such as to provide an approximately constant frequency of oscillations between no load and full load conditions.

5. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm of uncanvassed rubber provided with a peripheral bead and an annular reinforcement for said bead, said bead fluidtightly closing the opening of the cup and adapted to expand freely in a horizontal direction, the thickness of said diaphragm ranging between about 2 to 5% of the maximum transverse size of the said diaphragm, a plunger carried by the other part of the vehicle and engaging a substantial area of the yielding diaphragm to urge the latter gradually inwardly of the cup under the action of increasing loads, and an unvarying mass of air filling said chamber and the pressure of which is substantially equal to atmospheric pressure under no load conditions of the vehicle, said air spring having a variable rate so selected that the sum of the rates of the two springs varies in a manner such as to provide an approximately constant frequency of oscillations between no load and full load conditions.

6. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle and independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm of uncanvassed rubber fluidtightly closing the opening of the cup and adapted to expand freely in a horizontal direction, the thickness of said diaphragm ranging between about 2 to 5% of the maximum transverse size of said diaphragm, a plunger carried by the other part of the vehicle and engaging a substantial area of the yielding diaphragm to urge the latter gradually inwardly of the cup under the action of increasing loads, and an unvarying mass of air filling said chamber and the pressure of which is substantially equal to atmospheric pressure under no load conditions of the vehicle, a small measured amount of liquid carried inside the chamber to reduce the space containing air in the chamber upon maximum engagement of the plunger with the diaphragm closing the chamber, said air spring having a variable rate so selected that the sum of the rates of the two springs varies in a manner such as to provide an approximately constant frequency of oscillations between no load and full load conditions.

7. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one part of the vehicle and facing the other part, an elastic diaphragm of uncanvassed rubber fluidtightly closing the opening of the cup and adapted to expand frely in a horizontal direction, the thickness of said diaphragm ranging between about 2 to 5% of the maximum size of said diaphragm, a plunger carried by the other part of the vehicle and engaging a substantial area of the yielding diaphragm to urge the latter gradually inwardly of the cup under the action of increasing loads, and an unvarying mass of air filling said chamber under predetermined pressure and temperature conditions and the pressure of which is substantially equal to atmospheric pressure under no load conditions of the vehicle, said air spring having a variable rate so selected that the sum of the rates of the two springs varies in a manner such as to provide an approximately constant frequency of oscillations between no load and full load conditions.

8. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm of uncanvassed rubber fluidtightly closing the opening of the cup and adapted to expand freely in a horizontal direction, the thickness of said diaphragm ranging between about 2 to 5% of the maximum transverse size of said diaphragm, means fluidtightly engaging the periphery of the diaphragm to urge it against the outer surface of the cup periphery and defining with said cup and diaphragm a substantially continuous outer surface for the air chamber, a plunger carried by the other part of the vehicle and engaging a substantial area of the diaphragm to urge the latter gradually inwardly of the cup under the action of increasing loads, and an unvarying mass of air filling said chamber and the pressure of which is substantially equal to atmospheric pressure under no load conditions of the vehicle, said air spring having a variable rate so selected that the sum of the rates of the two springs varies in a manner such as to provide an approximately constant frequency of oscillations between no load and full load conditions.

9. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts independently of each other and of which springs one is a mechanical spring and has a substantially constant rate and the other spring is an airspring constituted by a single, completely, permanently and fluidtightly sealed compressible air chamber including a rigid cup secured to one of the parts of the vehicle and facing the other part, an elastic diaphragm of uncanvassed rubber fluidtightly closing the opening of the cup and adapted to expand freely in a horizontal direction, the thickness of said diaphragm ranging between about 2 to 5% of the maximum transverse size of said diaphragm, an auxiliary flange surrounding the periphery of the cup to clamp fluidtightly between it and said periphery the periphery of the diaphragm, while leaving a very small empty space along the outer edge of said periphery of the diaphragm between said flange and the outer surface of the cup periphery, a plunger carried by the other part of the vehicle and engaging a substantial area of the yielding diaphragm to urge the latter gradually inwardly of the cup under the action of increasing loads, and an unvarying mass of air filling said chamber and the pressure of which is substantially equal to atmospheric pressure under no load conditions of the vehicle, said air spring having a variable rate so selected that the sum of the rates of the two springs varies in a manner such as to provide an approximately constant frequency of oscillations between no load and full load conditions.

10. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single, completely, permanently and fluidtightly sealed compressible air chamber, including a rigid cup secured to one of the parts of the vehicle and facing the other part, an elastic diaphragm of uncanvassed rubber fluidtightly closing the opening of the cup and adapted to expand freely in a horizontal direction, the thickness of said diaphragm ranging between about 2 to 5% of the maximum transverse size of said diaphragm, an annular member surrounding the outer periphery of the diaphragm to urge said periphery against the outer surface of the periphery of the cup, a plunger carried by the other part of the vehicle and engaging a substantial area of the yielding diaphragm to urge the latter gradually inwardly of the cup under the action of increasing loads, and an unvarying mass of air filling said chamber and the pressure of which is substantially equal to atmospheric pressure under no load conditions of the vehicle, said air spring having a variable rate so selected that the sum of the rates of the two springs varies in a manner such that it provides an approximately constant frequency of oscillations between no load and full load conditions.

References Cited in the file of this patent

UNITED STATES PATENTS

| | | |
|---|---|---|
| 1,133,337 | Tinkham | Mar. 30, 1915 |
| 2,361,575 | Thompson | Oct. 31, 1944 |
| 2,710,184 | Pemberton | June 7, 1955 |
| 2,848,956 | Deist | Aug. 26, 1958 |

FOREIGN PATENTS

| | | |
|---|---|---|
| 5,252 | France | Dec. 2, 1905 |
| | (3rd addition to 338,539) | |